United States Patent [19]

Stanley et al.

[11] 4,178,001
[45] Dec. 11, 1979

[54] PIPE COUPLING

[75] Inventors: John M. Stanley, Milledgeville; Bernard A. Greene, Gray, both of Ga.

[73] Assignee: AMSTED Industries Incorporated, Chicago, Ill.

[21] Appl. No.: 939,187

[22] Filed: Sep. 5, 1978

[51] Int. Cl.² .............................................. F16J 15/32
[52] U.S. Cl. .............................. 277/152; 277/207 A; 277/208; 277/230; 138/130; 138/155; 285/110
[58] Field of Search ..................... 277/24, 152, 207 R, 277/207 A, 208, 229, 230; 285/110, DIG. 22; 138/109, 130, 155

[56] References Cited

U.S. PATENT DOCUMENTS

| 1,926,197 | 9/1933 | Durr | 277/208 X |
| 2,485,940 | 10/1949 | Tremolada | 285/110 X |
| 3,573,871 | 4/1971 | Warner | 277/208 X |
| 3,575,430 | 4/1971 | Alpine | 285/110 X |
| 3,667,782 | 6/1972 | Viazzi | 285/110 |
| 4,023,834 | 5/1977 | Ewing et al. | 138/155 X |

FOREIGN PATENT DOCUMENTS

| 770502 | 10/1967 | Canada | 277/DIG. 2 |
| 2014329 | 10/1971 | Fed. Rep. of Germany | 285/110 |
| 2744739 | 4/1978 | Fed. Rep. of Germany | 285/110 |
| 1359234 | 3/1964 | France | 285/110 |
| 1412084 | 8/1965 | France | 285/110 |
| 1234783 | 6/1971 | United Kingdom | 285/110 |

*Primary Examiner*—Robert S. Ward, Jr.
*Attorney, Agent, or Firm*—Edward J. Brosius; Fred P. Kostka; John L. Schmitt

[57] ABSTRACT

A pipe coupling including an annular lip seal that wipes the contacted pipe portion clean, when inserted therein. The lip seal also, while the pipe is situated in place while in use, precludes the entry of foreign material, such as sand or dirt, between the pipe and coupling. An inner seal further prevents leakage between the pipe and the coupling.

2 Claims, 1 Drawing Figure

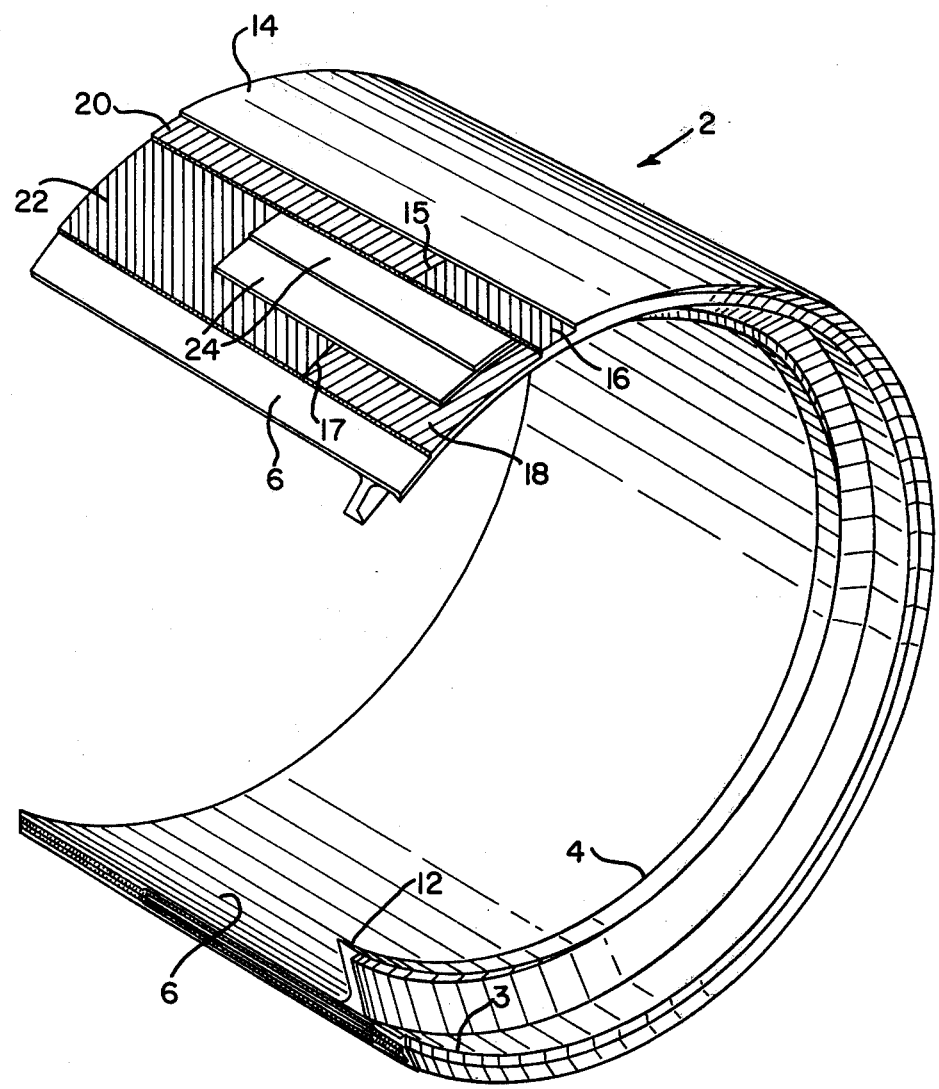

PIPE COUPLING

BACKGROUND OF THE INVENTION

This invention relates to simple, effective and inexpensive pipe couplings for use in the connection of pipes. The coupling includes a first annular seal that not only acts to clean the pipes during insertion thereof, but also precludes the entry of foreign materials, particularly sand or dirt used as back fill, from entering in between the coupling and the inserted pipes. The coupling also includes a second annular inner seal that prevents leakage between the inserted pipes and coupling while in use.

Heretofore, difficulty has been encountered in the prior art in attempting to seal couplings and pipes to prevent the deleterious effects resulting from entry of sand or dirt or other foreign material between the pipes and coupling, i.e., to prevent leakage into or from between the pipe and coupling, while in use. Many prior art attempts have been made to seal the coupling and the pipe; however, such attempts have been generally limited in that their use-life has been short. For example, taping, gluing, packing and other bonding methods have all resulted in a very short use-life, particularly with pipes subjected to pressures other than atmospheric with respect to the differential pressures in the pipes between the coupling and the pipes. The result being that, in many cases, it has been necessary to periodically, on a short time basis, require either preventive maintenance or maintenance after a leak between the coupling and pipe has been discovered. These prior art methods have also resulted in considerable expense not only from the maintenance standpoint, but also from the break-down standpoint involving, in some cases, the requirement of a shutdown of the entire pipe line. These problems have been shown to be particularly acute with respect to pipes made of ferrous type materials.

SUMMARY OF THE INVENTION

By the present invention, the aforementioned problems and difficulties of the prior art are substantially overcome by providing two seals carried by the coupling or, if desired, by the pipe, which will provide a press-fit engagement between the pipe and coupling. The first annular seal acts as a cleaner or sweeper of the pipe as it is being inserted into the coupling. The first seal further, once in place for use, because of its press-fit relationship between the pipe and coupling, precludes entry of foreign material or matter, such as sand or dirt from the back fill, from entering in between the pipe and coupling. Once the coupled pipes are in place for use, the connection is self-sealing due to the second annular inner seal regardless of the pressure differential between the applied pressure as defined by the back fill and the pressure of the fluid or material in passage through the pipe and coupling.

BRIEF DESCRIPTION OF THE DRAWING

The FIGURE is a perspective view, in section, illustrating the various components of a coupling usable in the present invention constructed of elastomeric or other rubber-like materials.

BRIEF DESCRIPTION OF THE PREFERRED EMBODIMENT

As shown in the drawing, a conventional pipe coupling 2 of generally cylindrical configuration is shown having a first annular seal 3 and an inwardly spaced second inner annular seal 4, constructed in accordance with the present invention, attached thereto. The seals 3 and 4 may be attached or carried by the coupling 2 in any conventional manner and, as shown in the drawing, may be molded of any conventional elastomeric or rubber-like material integral with the inner wall 6 of the coupling 2.

The seal 4 has a base affixed to the inner wall 6 of the coupling 2 and includes a flexible body portion of diminishing thickness in cross-section terminating or tapering to an outer feather leading edge or lip 12. The seal 4 is angled inwardly with respect to the longitudinal axis of the coupling 2 preferably to an angle of about 45° or at least at an angle sufficient to permit a press-fit with a corresponding pipe (not shown) inserted in the coupling in an amount sufficient to permit insertion of the pipe while preventing introduction of foreign material between the leading edge or lip 12 of the seal 4 and the contacting outer surface of the inserted pipe.

In experiments conducted in accordance with the above, it has been found that satisfactory results have been produced to perform the aforementioned sweeping or wiping effect while also performing the impeding effect when the connected pipe and coupling are in situ and in use.

The table below illustrates pipe size to coupling internal diameter (I.D.) ratios in terms of length of coupling, pipe outside diameters (O.D.) and coupling weights used in these experiments:

| PIPE I.D. IN.* | COUPLING I.D. IN.* | COUPLING LENGTH IN.* | PIPE O.D. IN.* | WEIGHT OF COUPLING GRAMS |
|---|---|---|---|---|
| 4 (10.16) | 5.230 (13.28) | 4 (10.16) | 5.250 (13.33) | 220 |
| 6 (15.24) | 7.285 (18.50) | 5 (12.70) | 7.300 (18.54) | 378 |
| 8 (20.32) | 9.685 (24.60) | 6 (15.24) | 9.700 (24.64) | 600 |
| 10 (25.40) | 11.850 (30.10) | 6.5 (16.51) | 11.875 (30.16) | 803 |
| 12 (30.48) | 14.225 (36.13) | 7 (17.78) | 14.250 (36.19) | 1010 |

*Number in parenthesis () is centimeter equivalent.

In these experiments, the seal 4 was molded integrally to the inner wall 6 of the coupling. The inner wall 6 was of 0.020 in. (0.05 cm.) thickness with an outer wall 14 of 0.020 in. (0.05 cm.) thickness, both constructed of rubber. Interposed and bonded between the inner and outer walls 6 and 14 is a two ply 0.050 in. (0.127 cm.) thickness of rubber of the same composition as the inner and outer walls 6 and 14 reinforced with conventional cord or type 30 roving laid at 65° to the longitudinal axis of the coupling with one right hand helix 16 and one left hand helix 18. Layers 16 and 18 extend for a length of two inches (5 cm.) back from first annular seal 3. Abutting layers 16 and 18 at seams 15 and 17, respectively, are layers 20 and 22, which are constructed of material similar to that of layers 16 and 18. However, as indicated in the drawing, layer 20 is a right hand helix and layer 22 is a left hand helix. Interposed and bonded between layers 16, 20 and 18, 22 are two identical layers 24, 26. Each layer 24, 26 is of 0.020 in. (0.05 cm.) thickness, 3.5 in, (8.89 cm.) in length, and each is constructed of rubber. These layers are seen to overlap the seams 15, 17 and provide better axle stiffness for the coupling 2.

The material of construction of the seal 4 may be rubber or a rubber-like compound, which has sufficient pliability and flexibility to perform the aforementioned wiping function. The lip portion of the seal 4 readily springs open to receive and permit passage of the pipe, but provides a sealing effect between the coupling and pipe once in place sufficient to exclude foreign matter normally encountered in use of the overall pipe line.

Thus couplings can be made in accordance with the present invention for various diameter pipes which provide the same or similar wiping, sealing and protecting features without additional components.

While a preferred embodiment of the present invention has been disclosed herein, it will be readily understood by those skilled in the art that various modifications and changes, such as devices of uniform cross-sectional thickness, may be made thereto without departing from the scope of the present invention, as set forth in the following claims.

What is claimed is:

1. A cylindrical pipe coupling including, an inner layer of rubber like material, a second layer of two sections of rubber like material reinforced with cord material, each section laid at an angle of about 65° with respect to the longitudinal axis of the coupling, one section having a left helix and the other a right helix, third and fourth layers of rubber like material positioned over the intersection of the two sections of said second layer, a fifth layer of two sections of rubber like material reinforced with cord material, each section laid at an angle of about 65° with respect to the longitudinal axis of the coupling, one section having a left helix and one a right helix, the helix of each section being opposite to the section of the second layer located under it, and a sixth layer of rubber like material located as an outer surface of said coupling, said coupling adapted to permit the insertion of a first pipe into one end thereof, said coupling further including a first annular insert located near the opposite end of the coupling, said first insert being comprised of a ridge shaped lip of rubber-like material affixed to or integral with the inner surface of said inner layer, said first insert defining an opening of a smaller diameter than said inner layer and being adapted to permit the insertion of a portion of a second pipe into said coupling, and a second annular insert located inwardly from said end of the coupling, said second insert comprising an inwardly protruding gasket shaped rubber like material affixed or integral with the inner surface of said inner layer, said second insert defining an angle of approximately 45° with said inner surface and defining an opening of a diameter less than the opening defined by said first insert, said first and said second inserts being adapted to permit the insertion of a portion of a second pipe into said coupling, thereby effectively sealing said first pipe with said second pipe.

2. The pipe coupling of claim 1, wherein said second insert comprises a base portion affixed to said inner surface of said inner layer, a flexible body portion and a flat outer lip portion.

* * * * *